(12) United States Patent
Shinozaki

(10) Patent No.: US 7,554,569 B2
(45) Date of Patent: Jun. 30, 2009

(54) LIGHT SCANNING DEVICE

(75) Inventor: Shimpei Shinozaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 106 days.

(21) Appl. No.: 11/623,555

(22) Filed: Jan. 16, 2007

(65) Prior Publication Data
US 2007/0165100 A1 Jul. 19, 2007

(30) Foreign Application Priority Data
Jan. 18, 2006 (JP) ............. P2006-009653

(51) Int. Cl.
G02B 26/10 (2006.01)
B41J 2/435 (2006.01)
(52) U.S. Cl. .................................... 347/263
(58) Field of Classification Search ............ 347/138, 347/152, 245, 263; 359/204, 205, 208
See application file for complete search history.

(56) References Cited

U.S. PATENT DOCUMENTS

| 6,859,295 | B2 | 2/2005 | Matsuoka | |
| 6,873,466 | B2 | 3/2005 | Hama et al. | |
| 2004/0257429 | A1 | 12/2004 | Iizuka et al. | |
| 2007/0081218 | A1* | 4/2007 | Matsuoka | 359/208 |
| 2007/0091405 | A1* | 4/2007 | Matsuoka | 359/205 |
| 2007/0159675 | A1* | 7/2007 | Matsuoka | 359/205 |

FOREIGN PATENT DOCUMENTS
JP 3075497 6/2000

OTHER PUBLICATIONS
U.S. Appl. No. 11/548,464 to Matsuoka, which was filed on Oct. 11, 2006.
U.S. Appl. No. 11/550,058 to Matsuoka, which was filed on Oct. 17, 2006.
U.S. Appl. No. 11/621,718 to Matsuoka, which was filed on Jan. 10, 2007.

* cited by examiner

Primary Examiner—Huan H Tran
(74) Attorney, Agent, or Firm—Greenblum & Bernstein, P.L.C.

(57) ABSTRACT

A light scanning device includes a light source that emits a laser beam, a deflector that deflects the laser beam emitted from the light source, a motor that drives the deflector so as to scan the deflected laser beam, an optical system that converges the deflected laser beam on an object surface, a housing configured such that the motor and the optical system are fixed thereto, the housing including one of a through hole penetrating from an inside thereof to an outside thereof and a thin portion whose wall thickness is thinner than any other portion of the housing, and a heat radiating member including an exposed portion that is exposed outside the housing, the heat radiating member being configured such that heat generated inside the housing is radiated outside the housing from the motor via one of the through hole and the thin portion, and the exposed portion.

16 Claims, 11 Drawing Sheets

LIGHT SCANNING DEVICE

BACKGROUND OF THE INVENTION

The present invention relates to a light scanning device employed for an electrophotographic type image forming device.

There is widely known as a light scanning device employed for an electrophotographic type image forming device such as a laser printer, copy machine, and facsimile machine a light scanning device configured such that a laser beam emitted by a light source is deflected by a polygon mirror being rotated. To meet a requirement for faster processing of the image forming device, there is desired a faster rotational speed of a drive motor that drives the polygon mirror of the light scanning device. In addition, an optical box constituting the optical scanning device has a sealed structure to prevent vibrations and/or noises accompanying the faster rotational speed of the drive motor from leaking outside the optical box and prevent dust from coming into the optical box. Therefore, such a sealed structure causes a problem that heat generated due to the faster rotational speed of the drive motor is stored up inside the optical box and affects optical components in the optical box. A conventional typical optical scanning device is disclosed, for example, in Japanese Granted Patent Publication No. 3075497 (hereinafter, referred to as '497 Publication).

Configuration examples of the light scanning device described in '497 Publication are shown in FIGS. 9-11. FIG. 9 schematically shows a configuration of the light scanning device. FIG. 10 is a cross-sectional view of the light scanning device along an X-X line shown in FIG. 9. The light scanning device has an optical box 3 provided with a light source 4, motor 7, lens system 13, circuit board 6, and polygon mirror 19. The optical box 3 is configured to be sealed with a cover member 5, metal portion 9 with high thermal conductivity, resin portion 11 (shaded area in the figures) with low thermal conductivity, motor 7, and cover glass 3a. The motor 7 includes a motor attachment member 17, motor main body 15, rotation axis 18 passing through the motor main body 15, and motor bearing portion 16. The motor attachment member 17 is fixed to the metal portion 9 as well as the circuit board 6. The polygon mirror 19 is fixed to the rotation axis 18.

A laser beam emitted by the light source 4 is deflected by the polygon mirror 19 being rotated, and illuminates a photo conductor outside the optical box 3. The heat generated due to the motor 7 is transmitted through the metal portion 9, and radiated from the metal portion 9 and motor bearing portion 16 to the outside of the optical box 3.

In addition, FIG. 11 shows another example of the light scanning device described in '497 Publication. The same reference numbers as those in FIG. 10 are given to the same portions as those in FIG. 10. In an optical box 30 shown in FIG. 11, a metal portion 90 is formed integrally with a cover member 50. The motor 7 is configured to contact with a resin portion 110 (shaded area) with low thermal conductivity (a cover glass 30a has low conductivity as well). Accordingly, the heat generated due to the motor 7 inside the optical box 30 is radiated outside the optical box 30 via the metal portion 90 with the high conductivity.

However, according to the light scanning device disclosed in '497 Publication, since the heat generated due to the motor 7 is radiated outside the optical box 3, the optical box 3 is required to be manufactured with the metal portion 9 being formed integrally with resin portion 11. It leads to a higher manufacture cost. In addition, the motor bearing portion 16 exposed outside the optical box 3 might be contaminated with dust. Further, in the optical box 3, the motor 7 and lens system 13 are provided on different bases, respectively (that is, the motor 7 is provided on the metal portion 9, while the lens system 13 is provided on the resin portion 11). Therefore, when a relative position of the metal portion 9 with respect to the resin portion 11 is even slightly displaced, it might cause a problem that the laser beam deflected by the polygon mirror 19 does not conform to the optical axis of the lens system 13. It is noted that the optical box 30, in which the motor 7 and lens system 13 are provided on the resin portion 110, has lower heat radiation efficiency than the optical box 3, as the metal portion 90 having a function of radiating the heat is interspatially located away from the motor 7.

SUMMARY OF THE INVENTION

The present invention is advantageous in that there can be provided an improved light scanning device including an optical box which can easily be manufactured, of which light scanning accuracy is hard to deteriorate, and which has an excellent heat radiating effect.

According to an aspect of the present invention, there is provided a light scanning device, which includes a light source configured to emit a laser beam, a deflector configured to deflect the laser beam emitted from the light source, a motor configured to drive the deflector so as to scan the laser beam deflected by the deflector, an optical system configured to converge the laser beam deflected by the deflector on an object surface, a housing configured such that the motor and the optical system are fixed thereto, the housing including one of a through hole penetrating from an inside thereof to an outside thereof and a thin portion whose wall thickness is thinner than any other portion of the housing, and a heat radiating member including an exposed portion that is exposed outside the housing, the heat radiating member being configured such that heat generated inside the housing is radiated outside the housing from the motor via one of the through hole and the thin portion, and the exposed portion included in the heat radiating member.

Optionally, the heat radiating member may have a thermal conductivity higher than that of the housing.

Optionally, the heat radiating member may include at least one heat radiating fin exposed outside the housing.

Optionally, the motor may be fixed to the housing inside the housing to cover the through hole included in the housing. In this case, the heat radiating member may be fixed to the housing outside the housing to cover the through hole. Still optionally, the motor may be in contact with the heat radiating member.

Optionally, a portion of the motor may be inserted into the through hole.

Alternatively or optionally, a portion of the heat radiating member may be inserted into the through hole.

Optionally, the motor may be fixed to the housing inside the housing to cover the thin portion included in the housing. In this case, the heat radiating member may be fixed to the housing outside the housing to cover the thin portion. Yet optionally, the thin portion may be in contact with the motor and the heat radiating member.

Optionally, the motor may be arranged to pass through the through hole included in the housing and fixed to the housing from the outside of the housing. In this case, the heat radiating member may be arranged to cover the motor outside the housing without contacting the motor.

Optionally, a thermal conducting member may be provided between the motor and the heat radiating member.

Further optionally, the motor may be in indirect contact with the heat radiating member via viscoelastic material with a thermal conductivity higher than the housing.

Optionally, the housing may include the through hole penetrating from the inside thereof to the outside thereof, and a motor supporting portion configured to support the motor. In this case, the motor supporting portion may be protruded toward the inside of the housing to surround the through hole. Yet optionally, the heat radiating member may be arranged within the motor supporting portion without contacting the motor.

Optionally, the heat radiating member may include at least one heat radiating fin formed inside the through hole. In this case, a distal end of the at least one heat radiating fin may be located within an outer surface of the housing.

Optionally, a thermal conducting member may be provided between the motor and the heat radiating member.

Still optionally, the motor may be in indirect contact with the heat radiating member via viscoelastic material with a thermal conductivity higher than the housing.

According to another aspect of the present invention, there is provided a light scanning device, which includes a light source configured to emit a laser beam, a deflector configured to deflect the laser beam emitted from the light source, a motor configured to drive the deflector so as to scan the laser beam deflected by the deflector, an optical system configured to converge the laser beam deflected by the deflector on an object surface, and a housing configured such that the motor and the optical system are fixed thereto, the housing including, a through hole penetrating from an inside thereof to an outside thereof, and at least one protruded portion formed within the through hole to taper toward a distal end thereof in a depth direction of the through hole from an outside of the housing to an inside of the housing. The motor is fixed to the housing inside the housing to cover the through hole.

BRIEF DESCRIPTION OF THE ACCOMPANYING DRAWINGS

FIG. 1 schematically shows a configuration of a light scanning device according to one or more aspects of the present invention.

Figure 9:
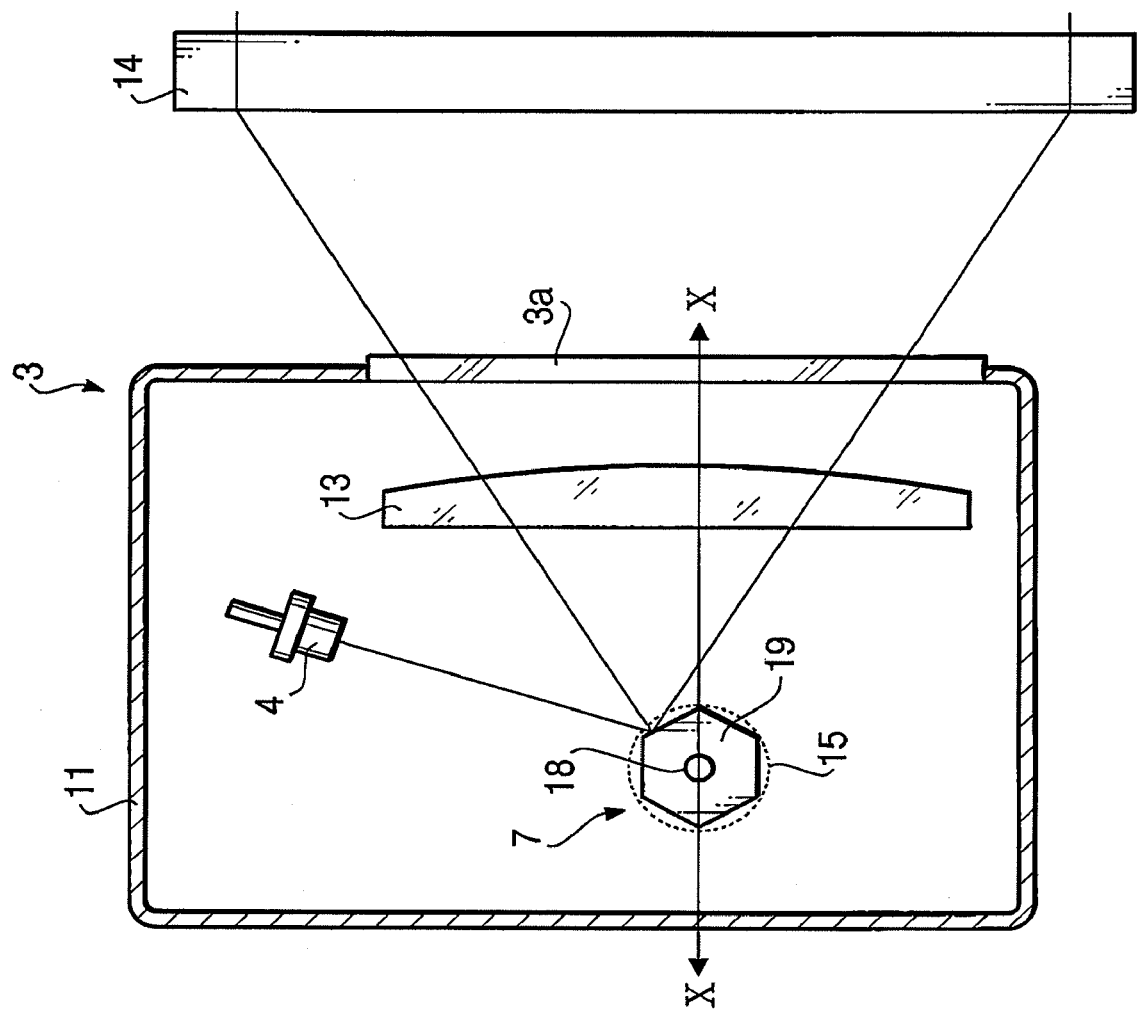

FIG. 9 schematically shows a configuration of a conventional light scanning device.

Figure 10:
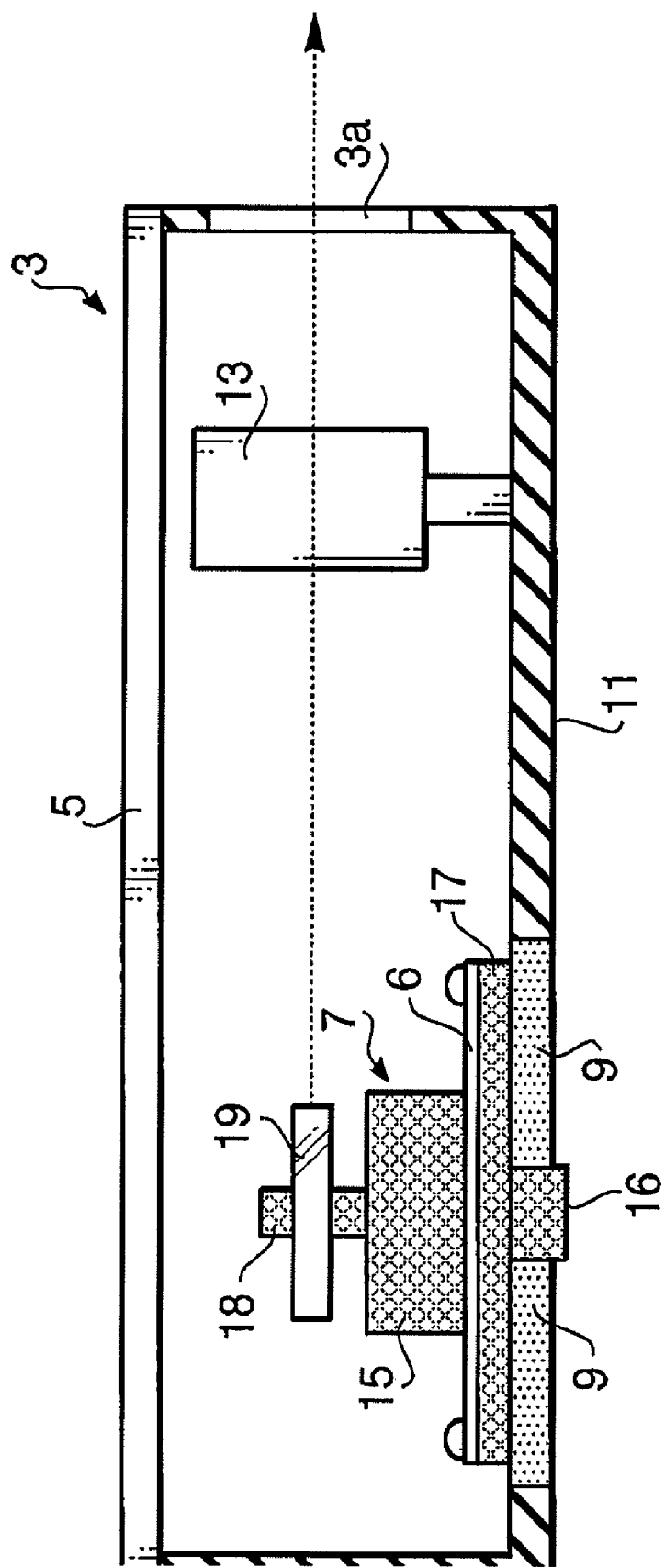

FIG. 10 is a cross-sectional view of an optical box of the conventional light scanning device along an X-X line shown in FIG. 9.

Figure 11:
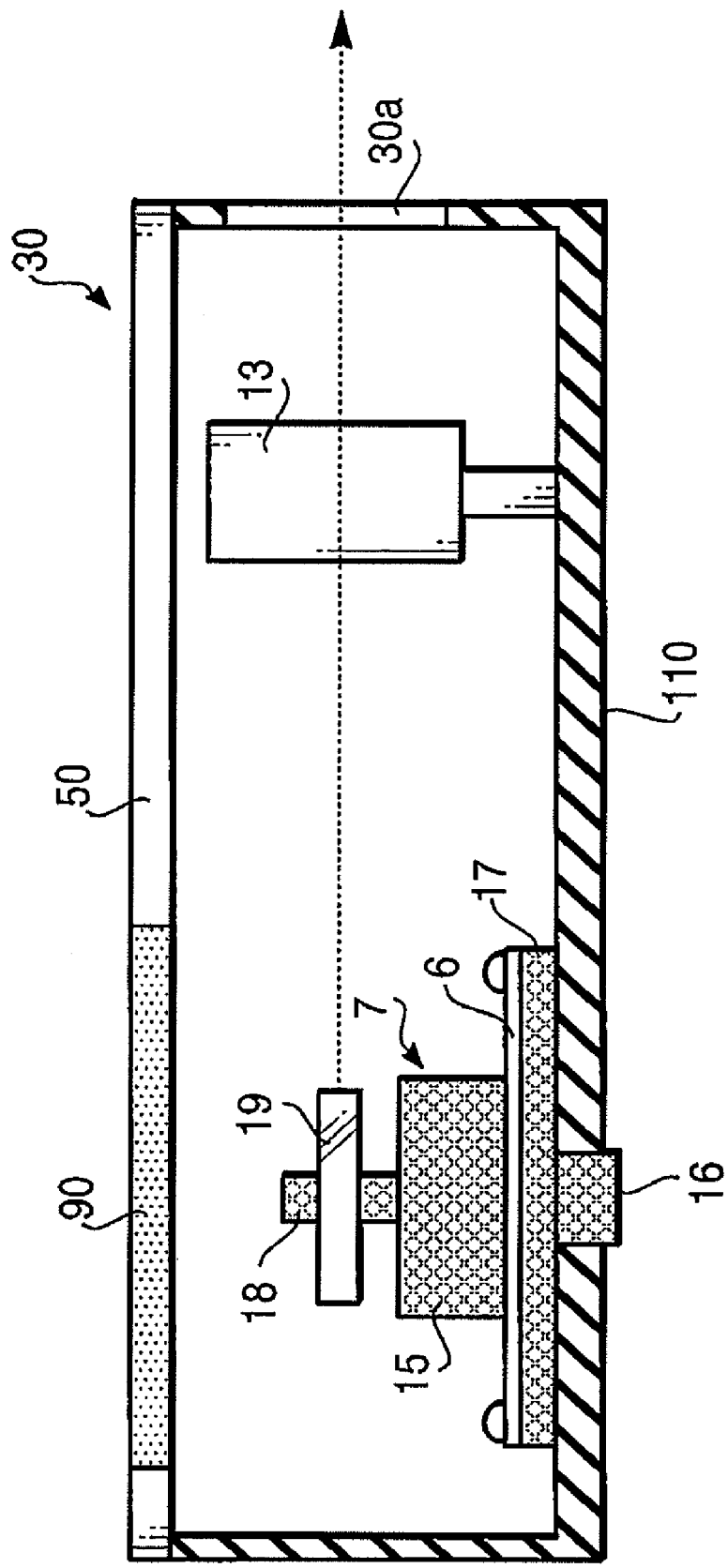

FIG. 11 shows another example of a cross-sectional view of an optical box of the conventional light scanning device along an X-X line shown in FIG. 9.

DETAILED DESCRIPTION OF THE EMBODIMENTS

Figure 1:
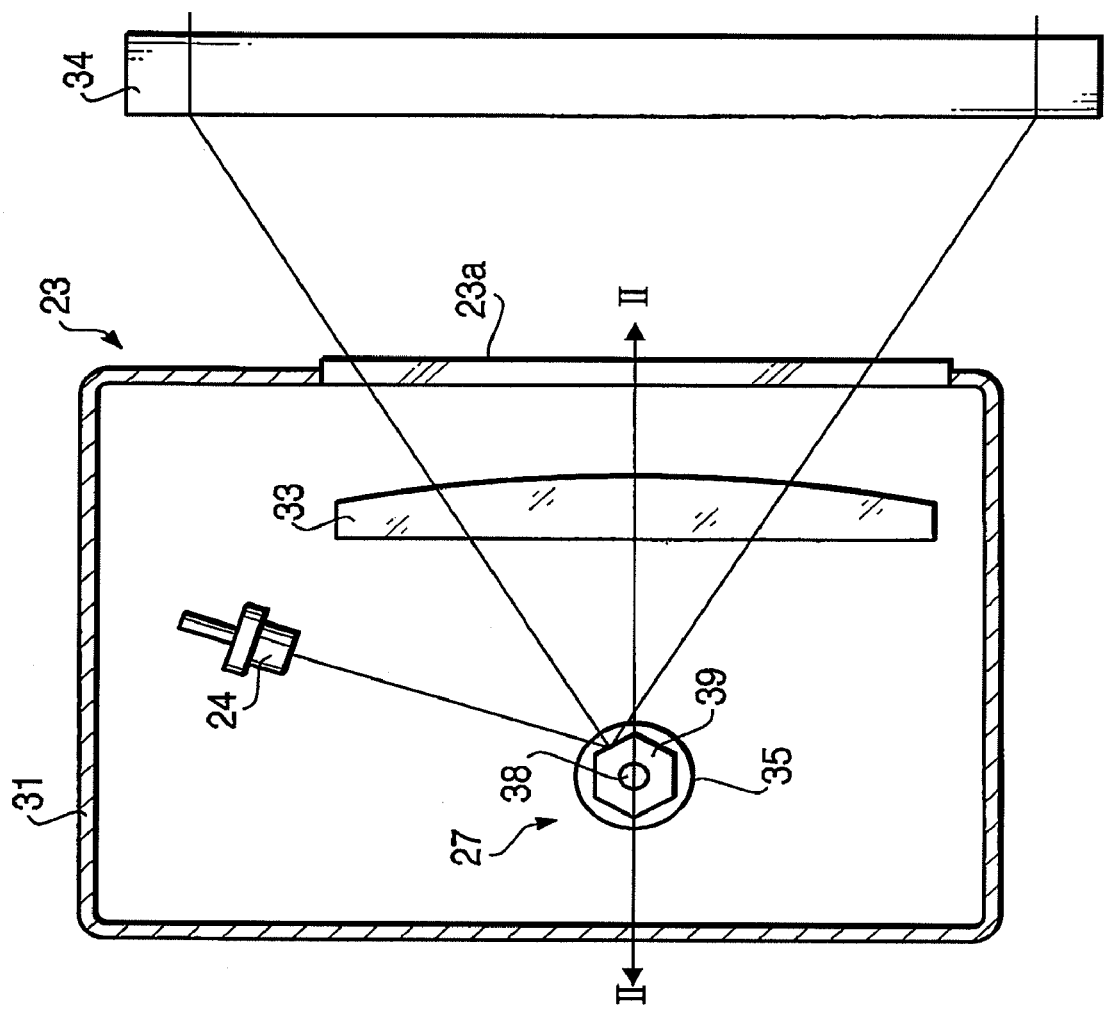
Figure 2:
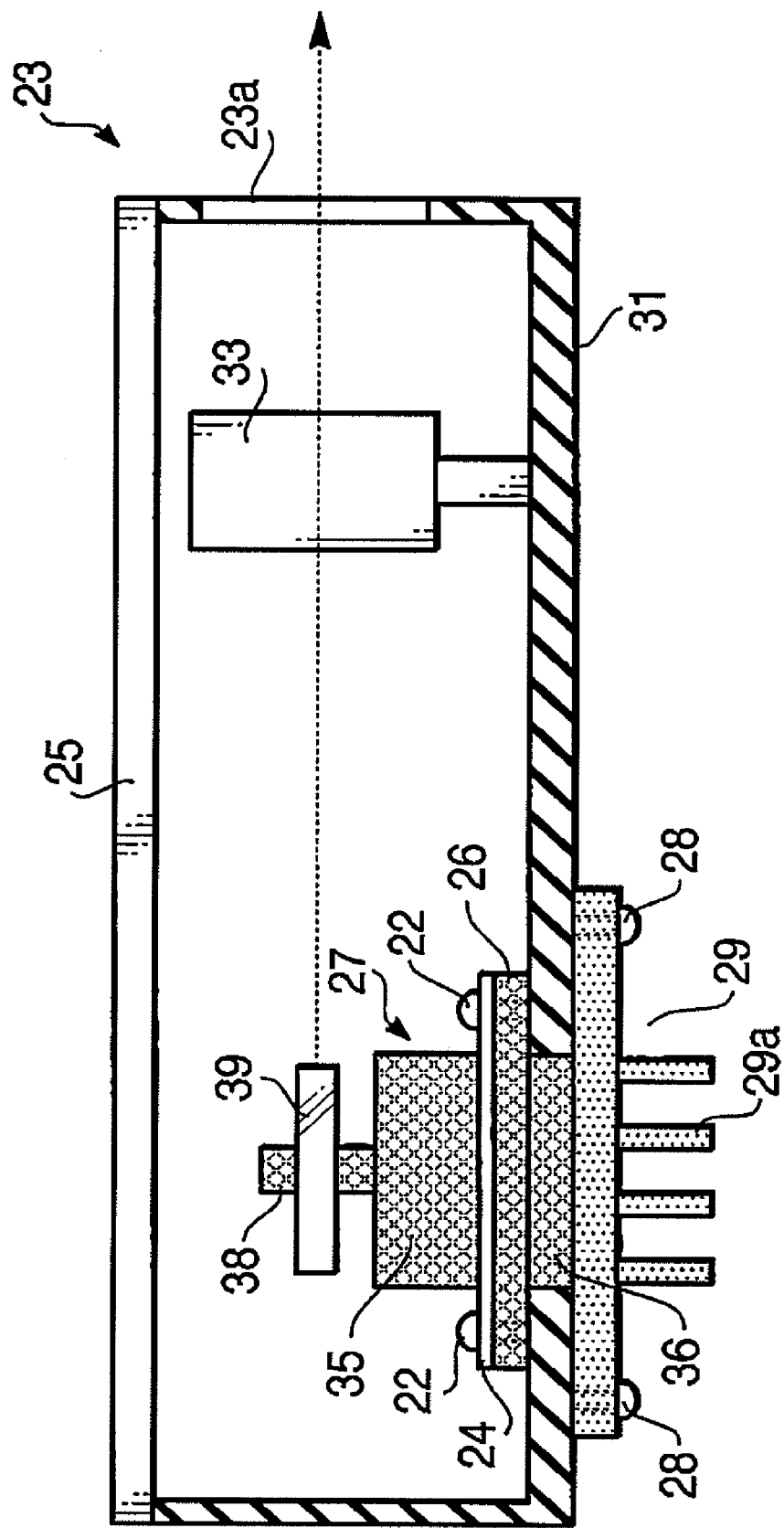
FIG. 2 is a cross-sectional view of an optical box of the light scanning device along a II-II line shown in FIG. 1 according to a first embodiment of the present invention.

Hereinafter, embodiments of a light scanning device according to the present invention will be explained with reference to the accompanying drawings. FIG. 1 schematically shows a configuration of a light scanning device according to the present invention. FIG. 2 is a cross-sectional view of an optical box 23 of the light scanning device along a II-II line shown in FIG. 1 in a first embodiment according to the present invention. As shown in FIG. 2, the light scanning device includes the optical box 23 provided with a light source 24, motor 27, heat radiating member 29, lens system 33 as an "optical member", and a polygon mirror 39 as a "deflector". There may be employed as the deflector a galvano mirror configured to tilt a mirror reflecting surface.

The optical box 23 is a box-shaped member in which some of the components constituting the light scanning device are provided, and includes a cover member 25 and a housing 31 that are formed from resin material. The housing 31 includes an opening that opens outside the optical box 23, and an inside thereof is sealed by the cover member 25 covering the opening. In addition, a cover glass 23a is formed at a portion of the housing 31.

The motor 27 is provided with a motor attachment member 26, motor main body 35, motor bearing portion 36, and rotation axis 38. The motor attachment member 26 is formed integrated with the motor bearing portion 36, and is fixed to the housing 31 by screws 22 inside the housing 31. In addition, there is arranged on the motor attachment member 26 a circuit board 24 required for controlling motor drive, which is fixed to the housing 31 as well as the motor attachment member 26. Further, the polygon mirror 39 is attached to the rotational axis 38, and accompanying rotation of the motor 27, reflecting surfaces of the polygon mirror 39 are rotated. A light beam emitted by the light source 24 is deflected by the reflecting surfaces of the polygon mirror 39 being rotated, and is incident onto a photoconductor 34 outside the optical box 23 via the lens system 33 and cover glass 23a.

There is formed at a bottom surface (a surface to which the motor 27 is provided) of the housing 31 a through hole penetrating from the inside to the outside of the optical box 23. The heat radiating member 29, formed from material with high thermal conductivity such as metal, is fixed to the housing 31 by screws 28 so as to cover the through hole outside the housing 31. The heat radiating member 29 includes heat radiating fins 29a to increase a heat radiating area in contact with an air outside the optical box 23. The motor bearing portion 36 is inserted into the through hole, and contacts with the heat radiating member 29.

Since the motor bearing portion 36 is in contact with the heat radiating member 29, the heat generated due to the motor 27 is transmitted to the heat radiating member 29 via a contact surface (or contact points) between the motor bearing portion 36 and the heat radiating member 29. In addition, as the through hole of the housing 31 is completely covered with the heat radiating member 29, it is possible to prevent noises from the motor 27 from leaking outside the optical box 23 and to prevent the motor bearing portion 36 from being contaminated with dust.

Further, since the through hole of the housing 31 is covered with the heat radiating member 29, the through hole may be formed to be of a relatively large diameter. For this reason, in a process of manufacturing the optical box 23, a worker can support the motor 27 outside the housing 31. Thereby, efficiency of operations of arranging the motor 27 is improved. Further, it is possible to easily check a rot number (identification number) of the motor 27 from a bottom of the housing 31. Additionally, a conventional process in which an optical box is formed with a metal portion and a resin portion being integrated is not required for the aforementioned configuration of the optical box 23. Thereby, the optical box 23 in the first embodiment needs a manufacturing cost less than the conventional optical box.

Figure 3:
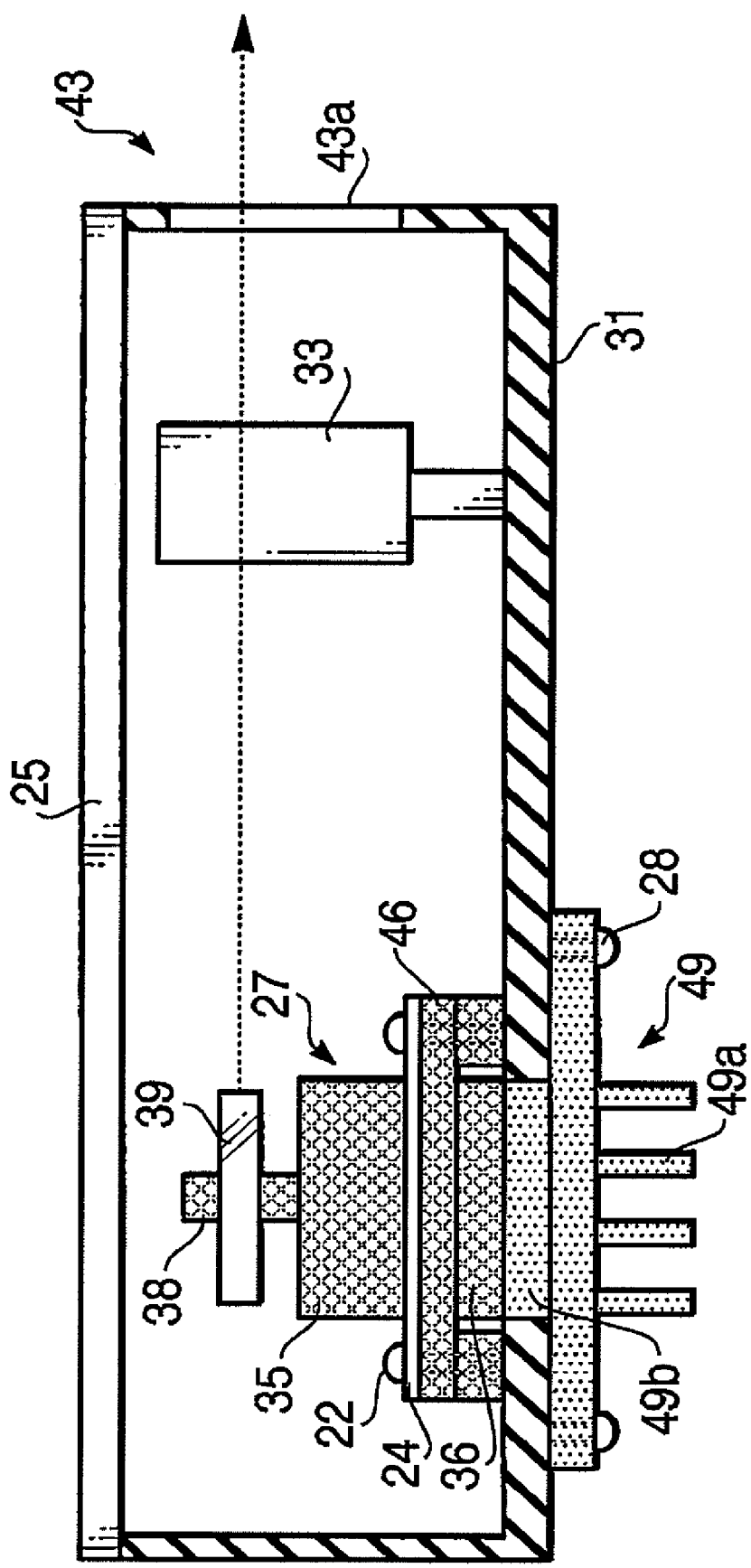
FIG. 3 is a cross-sectional view of an optical box of a light scanning device, along a line corresponding to the II-II line shown in FIG. 1, according to a second embodiment of the present invention.

FIG. 3 is a cross-sectional view of an optical box 43 of a light scanning device, along a line corresponding to the II-II line shown in FIG. 1, in a second embodiment according to the present invention. The optical box 43 shown in FIG. 3 can be replaced with the optical box 23 shown in FIG. 1. In FIG. 3, components indicated by the same reference numbers as those shown in FIGS. 1 and 2 correspond to the same components shown in FIGS. 1 and 2, respectively (hereinafter, the same reference number indicates the same component).

A heat radiating member 49 formed from material with higher thermal conductivity than the housing 31 is fixed to the housing 31 with the screws 28 so as to cover the through hole outside the housing 31. The heat radiating member 49 is provided with a protruded portion 49b and heat radiating fins 49a. The protruded portion 49b is inserted into the through hole, and is in (close) contact with the motor 27 within the through hole or within the optical box 23. The protruded portion 49b is formed to be in close contact with an inner circumferential surface of the through hole. A motor attachment member 46 is configured to adjust height of the polygon mirror 39 from a bottom surface of the housing 31 such that the laser beam deflected by the polygon mirror 39 conforms to an optical axis of the lens system 33. In the second embodiment, the optical box 43 is configured with the protruded portion 49b of the heat radiating member 49 being inserted into the through hole to be in close contact with the through hole, so as to improve seal performance of the optical box 43 and keep heat radiating performance. With the protruded portion 49b being in contact with the motor bearing portion 36, the heat generated due to the motor 27 (and the circuit board 24) is radiated outside via the heat radiating member 49.

Figure 4:
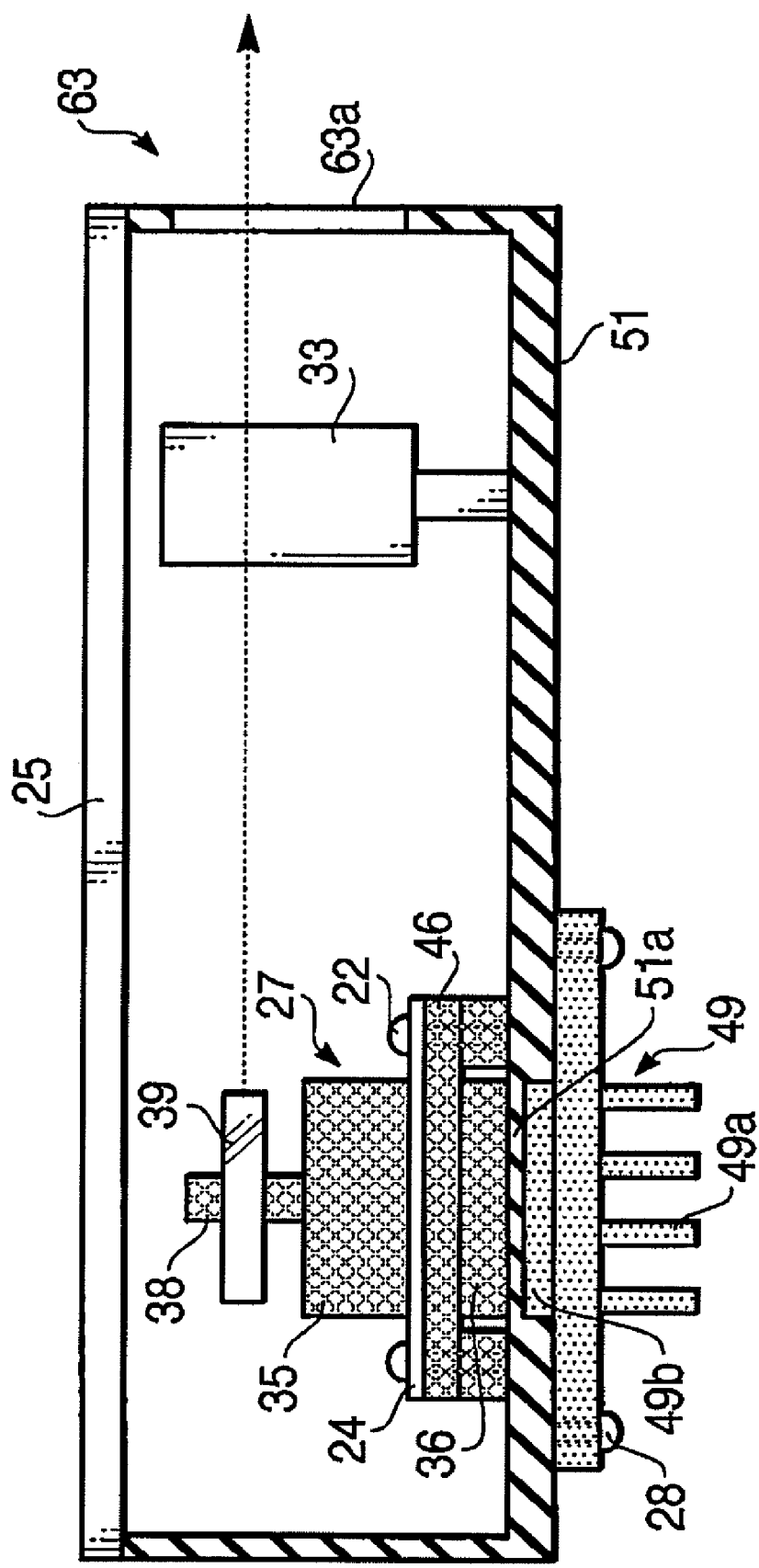
FIG. 4 is a cross-sectional view of an optical box of a light scanning device, along a line corresponding to the II-II line shown in FIG. 1, according to a third embodiment of the present invention.

FIG. 4 is a cross-sectional view of an optical box 63 of a light scanning device in a third embodiment according to the present invention along a line corresponding to the II-II line shown in FIG. 1. The optical box 63 shown in FIG. 4 can be replaced with the optical box 23 shown in FIG. 1. A cover glass 63a is formed at a portion of a housing 51. The housing 51 is provided with a thin-walled portion 51a, located under the motor 27, whose wall thickness is thinner than any other portions of the housing 51. The motor 27 is in (close) contact with the thin-walled portion 51a inside the optical box 63. The heat radiating member 49 is fixed to the housing 51 with the screws 28 outside the housing 51. The protruded portion 49b is in (close) contact with the thin-walled portion 51a of the housing 51 outside the optical box 63.

The thin-walled portion 51a is formed to be so thin that the heat generated due to the motor 27 can easily be transmitted to the heat radiating member 49. The heat transmitted to the heat radiating member 49 via the thin-walled portion 51a is radiated from the heat radiating member 49 to the outside of the optical box 63. In the third embodiment, a through hole, such as the through hole in the first and second embodiments, is not formed at any portion of the housing 51. Thereby, the optical box 63 has high seal performance, so that it is possible to more certainly prevent dust from coming into the optical box 63 and to more certainly prevent vibrations and/or noises from leaking outside the optical box 63.

Figure 5:
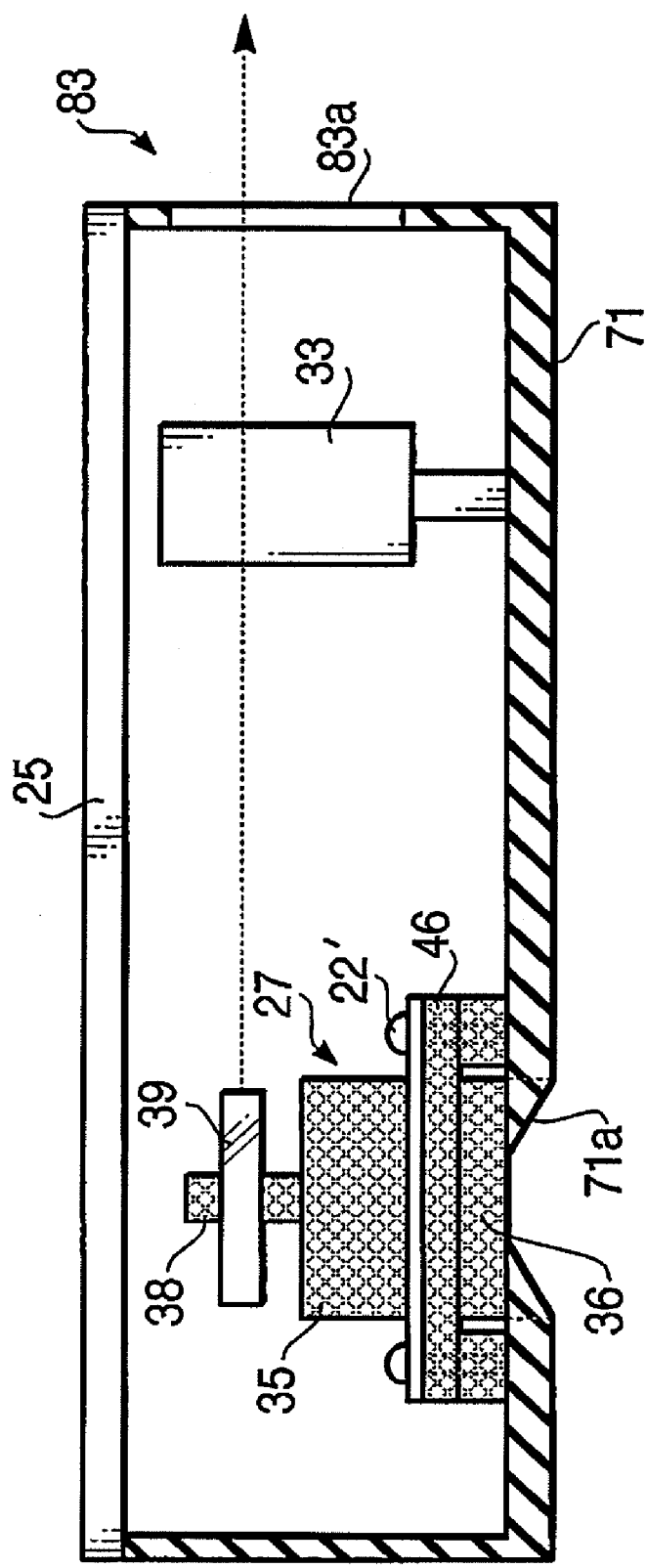
FIG. 5 is a cross-sectional view of an optical box of a light scanning device, along a line corresponding to the II-II line shown in FIG. 1, according to a fourth embodiment of the present invention.
Figure 6:
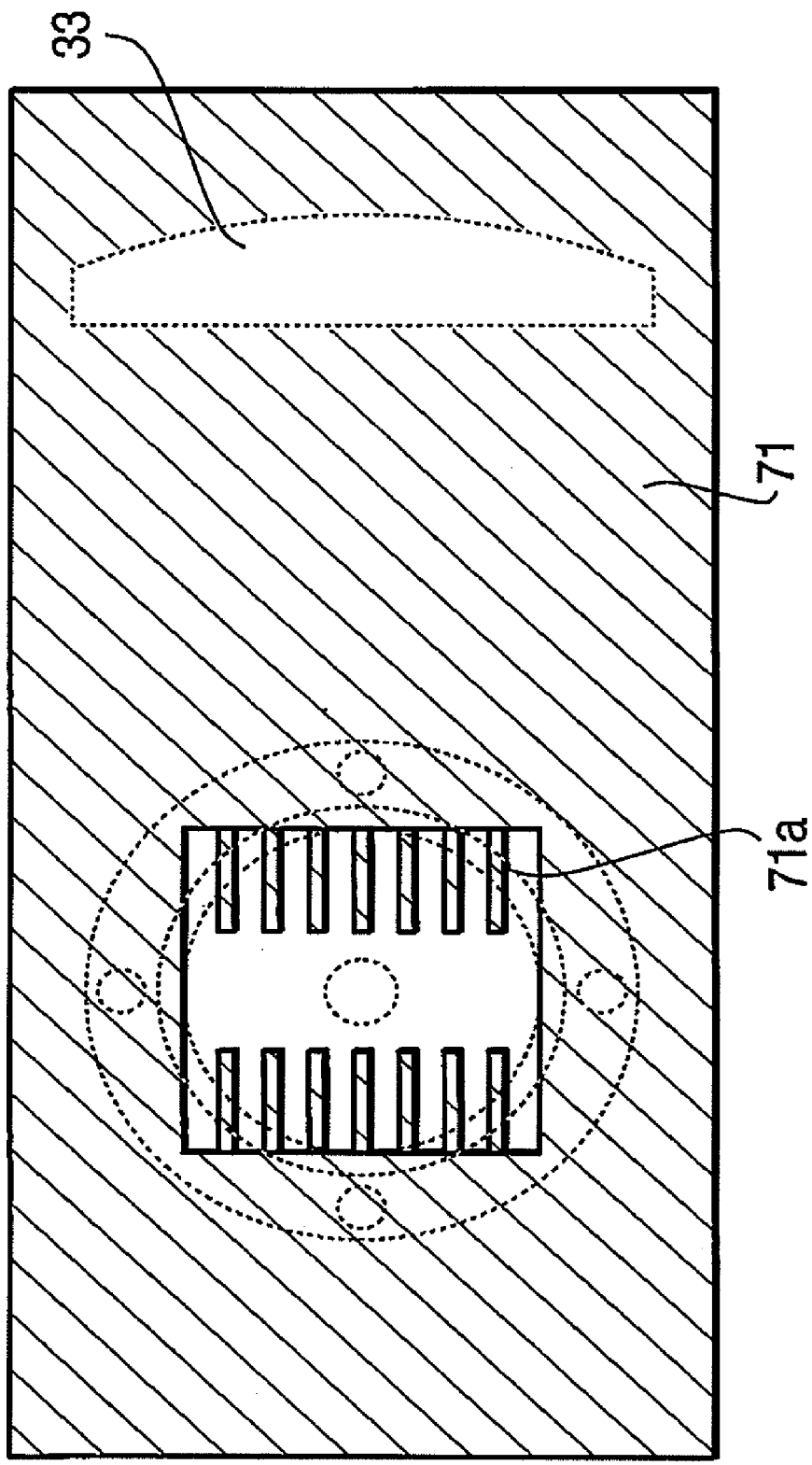
FIG. 6 is a bottom view of the optical box 83 shown in FIG. 5.

FIG. 5 is a cross-sectional view of an optical box 83 of a light scanning device in a fourth embodiment according to the present invention along a line corresponding to the II-II line shown in FIG. 1. The optical box 83 shown in FIG. 5 can be replaced with the optical box 23 shown in FIG. 1. FIG. 6 is a bottom view of the optical box 83 shown in FIG. 5. A cover glass 83a is formed at a portion of the housing 71. At a bottom surface of the housing 71 on which the motor 27 is provided, there is formed a through hole penetrating from an inside to an outside of the optical box 83. In the through hole of the housing 71, two or more protruded portions 71a are formed as parts of the housing 71. As shown in FIG. 6, for example, the through hole is substantially of a rectangle shape, and is covered with a ring-shaped spacer arranged around the motor bearing portion 36 and the motor attachment member 46 so that the inside of the optical box 25 can be sealed. Further, each of the two or more protruded portions 71a is protruded by predetermined length from any of a predetermined couple of sides, facing each other, of the through hole toward the opposite side. It is noted that the shape of the through hole may be circular or polygonal. Further, the protruded portions 71a are in (close) contact with the bottom of the motor 27. Each of the protruded portions 71a tapers toward a distal end thereof in a wall thickness direction of the bottom of the housing 71 (in a depth direction of the through hole), and has a tapered cross-sectional shape, for example, as shown in FIG. 5.

Each of the protruded portions 71a tapers toward a vicinity of the center of the bottom of the motor 27 from a corresponding one of the predetermined couple of sides of the through hole. Therefore, such a configuration of the protruded portions 71a helps air outside the housing 71 flow toward the vicinity of the center of the bottom of the motor 27, and thereby makes it possible to efficiently cool the motor 27.

Figure 7:
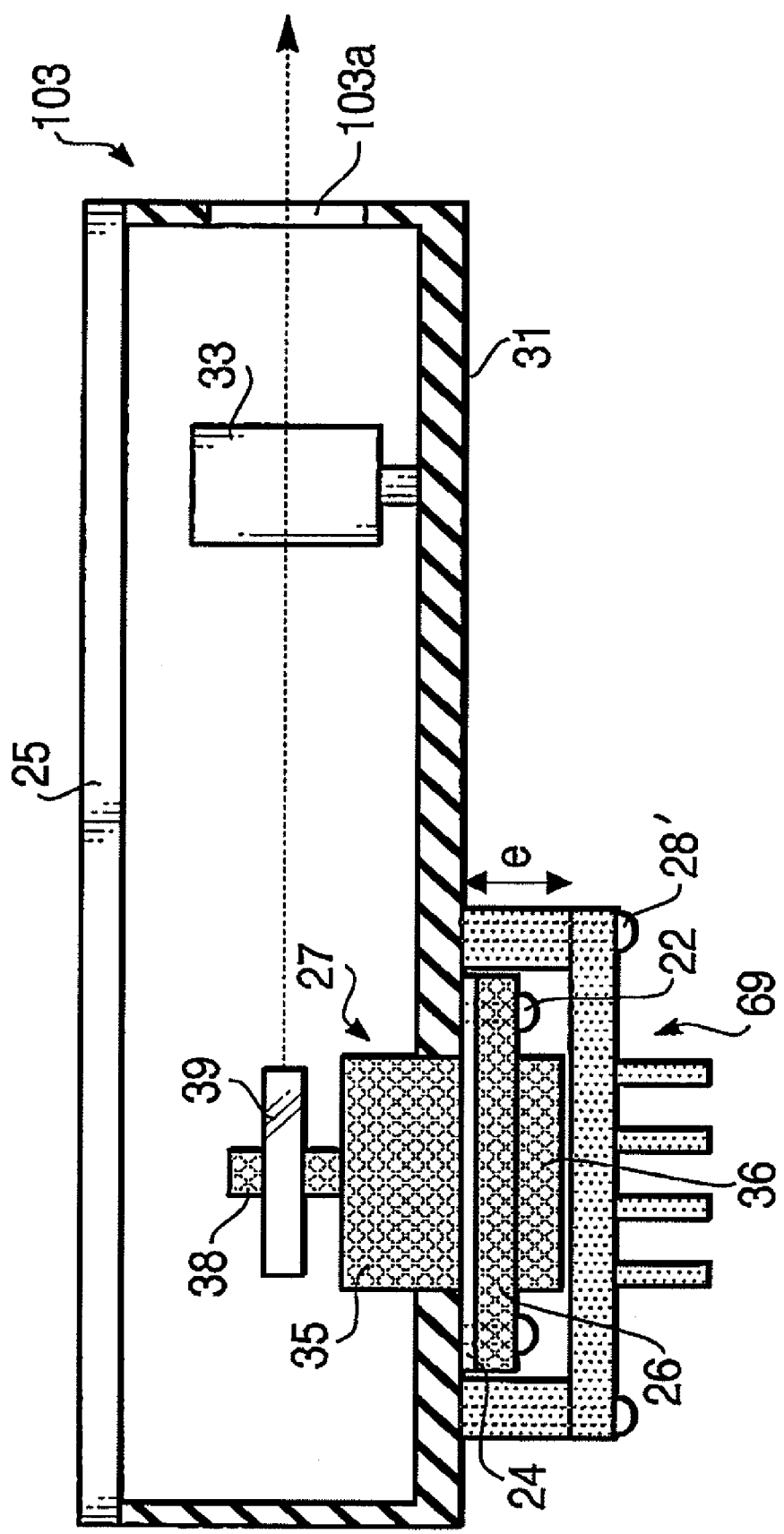
FIG. 7 is a cross-sectional view of an optical box of a light scanning device, along a line corresponding to the II-II line shown in FIG. 1, according to a fifth embodiment of the present invention.

FIG. 7 is a cross-sectional view of an optical box 103 of a light scanning device in a fifth embodiment according to the present invention along a line corresponding to the II-II line shown in FIG. 1. The optical box 103 shown in FIG. 7 can be replaced with the optical box 23 shown in FIG. 1. There is formed at the bottom surface (the surface to which the motor 27 is provided) of the housing 31 the through hole penetrating from the inside to the outside of the housing 31. The motor main body 35 of the motor 27 is inserted into the through hole. The motor attachment member 26 on which the circuit board 24 is provided is fixed to the bottom surface of the housing 31 with the screws 22 outside the housing 31. A heat radiating member 69 formed from material with higher thermal conductivity than the housing 31 is shaped to cover the circuit board 24, motor attachment portion 26, and motor bearing portion 36 that are arranged outside the housing 31 (hereinafter, referred to as a "motor projecting portion"), and is fixed to the housing 31 with screws 28' outside the housing 31 without being in contact with the motor projecting portion.

A thermal conducting member formed from viscoelastic material with high thermal conductivity, such as grease, is applied to a gap between the heat radiating member 69 and motor bearing portion 36. Therefore, the heat radiating member 69 is in indirect contact with the motor bearing portion 36 via the thermal conducting member. Optionally, a space surrounded by the motor projecting portion, heat radiating member 69, and housing 31 may be filled with the thermal conducting member. It is noted that when the space surrounded by the motor projecting portion, heat radiating member 69, and housing 31 is filled with the thermal conducting member, the circuit board 24 is covered with a predetermined protective member to prevent the thermal conducting member from contacting with any wire of the circuit board 24.

According to the fifth embodiment of the present invention, since the motor 27 is fixed to the housing 31 from the outside of the housing 31, the motor 27 can easily be attached from the outside of the optical box 103. In addition, since a volume the motor occupies inside the housing 31 is decreased, the heat generated due to the motor 27 inside the optical box 103 is reduced.

In addition, with the space surrounded by the motor projecting portion, heat radiating member 69, and housing 31 being filled with the thermal conducting member, wider superficial area of the motor 27 can be in contact with the thermal conducting member that has an heat radiating effect. Thus, the heat generated due to the motor 27 is efficiently transmitted to the thermal conducting member, and thereafter, is efficiently transmitted to the heat radiating member 69, radiated from the heat radiating member 69 to the outside of the optical box 103. Further, the viscoelastic thermal conducting member ensures seal performance and an effect of restraining the vibrations and noises.

Figure 8:
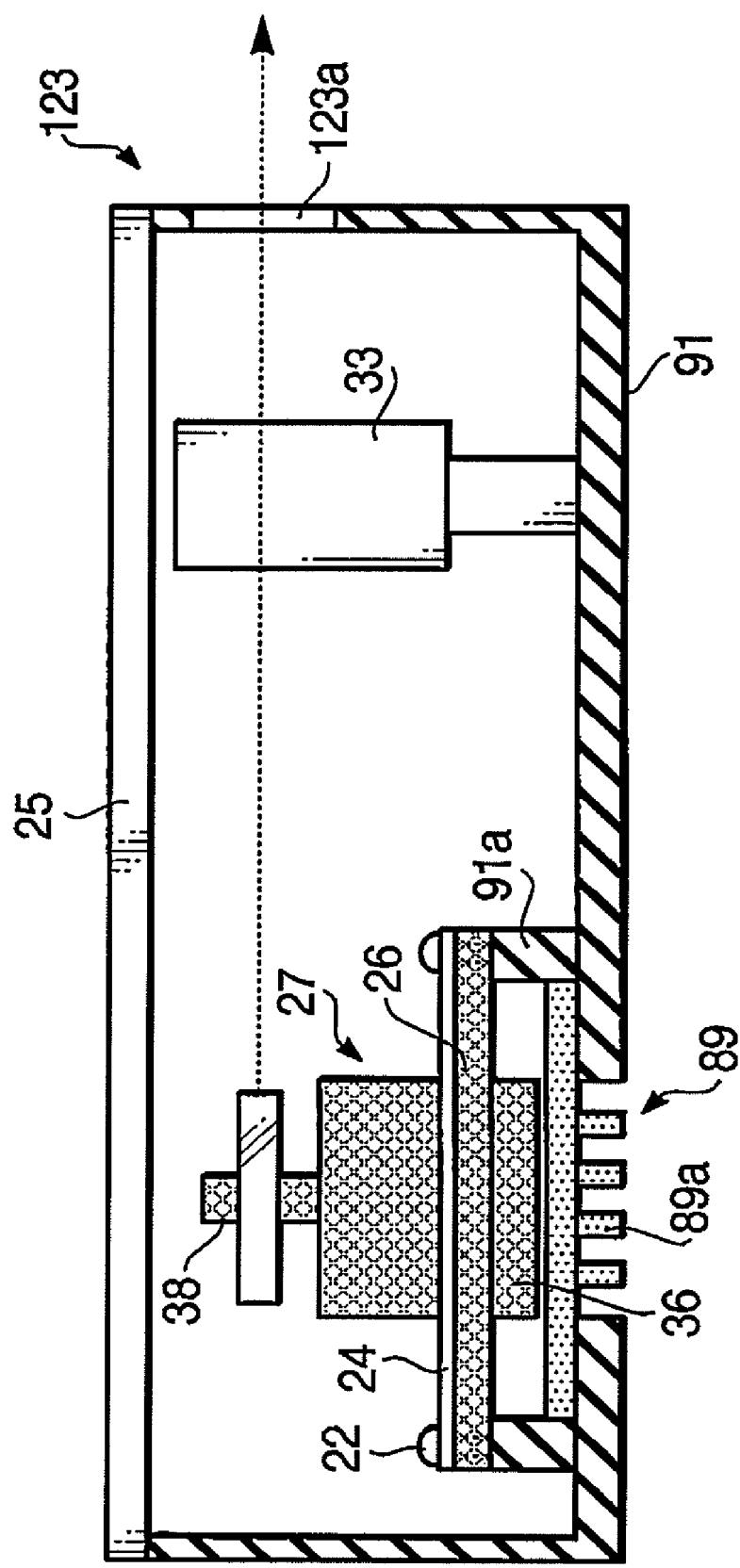
FIG. 8 is a cross-sectional view of an optical box of a light scanning device, along a line corresponding to the II-II line shown in FIG. 1, according to a sixth embodiment of the present invention.

FIG. 8 is a cross-sectional view of an optical box 123 of a light scanning device in a sixth embodiment according to the present invention along a line corresponding to the II-II line shown in FIG. 1. The optical box 123 shown in FIG. 8 can be replaced with the optical box 23 shown in FIG. 1. A cover glass 123a is formed at a portion of a housing 91. There is formed at a bottom surface of the housing 91 a through hole penetrating from an inside to an outside of the housing 91. The housing 91 includes a motor supporting portion 91a that is protruded inward from a bottom surface of the housing 91. The motor supporting portion 91a has a predetermined wall thickness and a predetermined height from the bottom surface of the housing 91, and is formed to be protruded inward from the bottom surface of the housing 91 as surrounding the through hole. A heat radiating member 89 is shaped to be arranged in an area surrounded by the motor supporting member 91a and to be fitted within the motor supporting portion 91a. Further, the heat radiating member 89 is arranged to be in close contact with an inner bottom surface of the housing 91 around the through hole. Alternatively or optionally, the heat radiating member 89 may be fixed to the housing 91 with screws.

In addition, the heat radiating member 89 has heat radiating fins 89a. In a state where the heat radiating member 89 is attached to the housing 91, the heat radiating fins 89a are arranged within the through hole. Each of the heat radiating fins 89a is configured not to be protruded from an outer bottom surface of the housing 91 in the state where the heat radiating member 89 is attached to the housing 91.

The motor 27 is fixed to the motor supporting portion 91a with the screws 22 inside the housing 91. At this time, the motor supporting portion 91a is configured to have a thickness higher than the thickness of the motor bearing portion 36 added to the thickness of the heat radiating member 89 (other than the heat radiating fins 89a), and thus a gap is formed between a bottom surface of the motor bearing portion 36 and the heat radiating portion 89. The same thermal conducting member as used for the optical box 103 (see FIG. 7) in the fifth embodiment is applied to the gap. In addition, a space surrounded by the motor attachment member 26, motor bearing portion 36, heat radiating member 89, and motor supporting portion 91a may be filled with the thermal conducting member.

With the space surrounded by the motor attachment member 26, motor bearing portion 36, heat radiating member 89, and motor supporting portion 91a being filled with the thermal conducting member, in the same manner as aforementioned in the fifth embodiment, efficient heat transmission from the motor 27 to the heat radiating member 89 can be attained. Further, since the heat radiating fins 89a are not protruded from the outer bottom surface of the housing 91, the optical box 91 can be more downsized.

The present disclosure relates to the subject matter contained in Japanese Patent Application No. P2006-009653, filed on Jan. 18, 2006, which is expressly incorporated herein by reference in its entirety.

What is claimed is:

1. A light scanning devices comprising:
a light source configured to emit a laser beam;
a deflector configured to deflect the laser beam emitted from the light source;
a motor configured to drive the deflector so as to scan the laser beam deflected by the deflector;
an optical system configured to converge the laser beam deflected by the deflector on an object surface;
a housing configured such that the motor and the optical system are fixed thereto, the housing including a through hole penetrating from an inside thereof to an outside thereof; and
a heat radiating member including an exposed portion that is exposed outside the housing, the heat radiating member being configured such that heat generated inside the housing is radiated outside the housing from the motor via the through hole, and the exposed portion included in the heat radiating member,
wherein the motor is fixed to the housing inside the housing to cover the through hole,
wherein the heat radiating member is fixed to the housing outside the housing to cover the through hole and has a thermal conductivity higher than that of the housing, and
wherein the motor is in contact with the heat radiating member.

2. The light scanning device according to claim 1, wherein the heat radiating member includes at least one heat radiating fin exposed outside the housing.

3. The light scanning device according to claim 1, wherein a portion of the motor is inserted into the through hole.

4. The light scanning device according to claim 1, wherein a portion of the heat radiating member is inserted into the through hole.

5. A light scanning device comprising:
a light source configured to emit a laser beam;
a deflector configured to deflect the laser beam emitted from the light source;
a motor configured to drive the deflector so as to scan the laser beam deflected by the deflector;
an optical system configured to converge the laser beam deflected by the deflector on an object surface;
a housing configured such that the motor and the optical system are fixed thereto, the housing including a thin portion whose wall thickness is thinner than any other portion of the housing; and
a heat radiating member including an exposed portion that is exposed outside the housing, the heat radiating member being configured such that heat generated inside the housing is radiated outside the housing from the motor via the thin portion, and the exposed portion included in the heat radiating member, wherein the motor is fixed to the housing inside the housing to cover the thin portion, wherein the heat radiating member is fixed to the housing outside the housing to cover the thin portion and has a thermal conductivity higher than that of the housing, and wherein the thin portion is in contact with the motor and the heat radiating member.

6. The light scanning device according to claim 5, wherein the heat radiating member includes at least one heat radiating fin exposed outside the housing.

7. A light scanning device, comprising:
a light source configured to emit a laser beam;
a deflector configured to deflect the laser beam emitted from the light source;
a motor configured to drive the deflector so as to scan the laser beam deflected by the deflector;
an optical system configured to converge the laser beam deflected by the deflector on an object surface;
a housing configured such that the motor and the optical system are fixed thereto, the housing including a through hole penetrating from an inside thereof to an outside thereof; and
a heat radiating member including an exposed portion that is exposed outside the housing, the heat radiating member being configured such that heat generated inside the housing is radiated outside the housing from the motor via the through hole, and the exposed portion included in the heat radiating member,
wherein the motor is arranged to pass through the through hole and fixed to the housing from the outside of the housing, and
wherein the heat radiating member is arranged to cover the motor outside the housing without contacting the motor and has a thermal conductivity higher than that of the housing.

8. The light scanning device according to claim 7, wherein a thermal conducting member is provided between the motor and the heat radiating member.

9. The light scanning device according to claim 8, wherein the motor is in indirect contact with the heat radiating member via viscoelastic material with a thermal conductivity higher than the housing.

10. The light scanning device according to claim 7, wherein the heat radiating member includes at least one heat radiating fin exposed outside the housing.

11. A light scanning devices comprising:
a light source configured to emit a laser beam;
a deflector configured to deflect the laser beam emitted from the light source;
a motor configured to drive the deflector so as to scan the laser beam deflected by the deflector;
an optical system configured to converge the laser beam deflected by the deflector on an object surface;
a housing configured such that the motor and the optical system are fixed thereto, the housing including a through hole penetrating from an inside thereof to an outside thereof, and a motor supporting portion configured to support the motor; and
a heat radiating member including an exposed portion that is exposed outside the housing, the heat radiating member being configured such that heat generated inside the housing is radiated outside the housing from the motor via the through hole, and the exposed portion included in the heat radiating member,
wherein the motor supporting portion is protruded toward the inside of the housing to surround the through hole, and
wherein the heat radiating member is arranged within the motor supporting portion without contacting the motor and has a thermal conductivity higher than that of the housing.

12. The light scanning device according to claim 11,
wherein the heat radiating member includes at least one heat radiating fin formed inside the through hole, and
wherein a distal end of the at least one heat radiating fin is located within an outer surface of the housing.

13. The light scanning device according to claim 11, wherein a thermal conducting member is provided between the motor and the heat radiating member.

14. The light scanning device according to claim 13, wherein the motor is in indirect contact with the heat radiating member via viscoelastic material with a thermal conductivity higher than the housing.

15. The light scanning device according to claim 11, wherein the heat radiating member includes at least one heat radiating fin exposed outside the housing.

16. A light scanning device, comprising:
a light source configured to emit a laser beam;
a deflector configured to deflect the laser beam emitted from the light source;
a motor configured to drive the deflector so as to scan the laser beam deflected by the deflector;
an optical system configured to converge the laser beam deflected by the deflector on an object surface; and
a housing configured such that the motor and the optical system are fixed thereto, the housing including:
a through hole penetrating from an inside thereof to an outside thereof; and
at least one protruded portion formed within the through hole to taper toward a distal end thereof in a depth direction of the through hole from an outside of the housing to an inside of the housing,
wherein the motor is fixed to the housing inside the housing to cover the through hole.

* * * * *